United States Patent [19]

Wolber

[11] 4,109,870
[45] Aug. 29, 1978

[54] MULTIORIFICE STRUCTURE AND METHOD OF MAKING SAME

[75] Inventor: William George Wolber, Southfield, Mich.

[73] Assignee: The Bendix Corporation, Southfield, Mich.

[21] Appl. No.: 792,426

[22] Filed: Apr. 29, 1977

[51] Int. Cl.² .............................................. B05B 1/14
[52] U.S. Cl. ................................... 239/558; 428/36; 428/64; 428/188
[58] Field of Search .................. 428/188, 36, 64, 166, 428/186, 110, 586, 593, 594, 614; 48/180, 180 M; 261/112, 78 R, 78 A; 123/141; 274/120 R; 239/558

[56] References Cited

U.S. PATENT DOCUMENTS

| 3,602,620 | 8/1971 | Fassler | 431/99 |
| 3,830,286 | 8/1974 | Clarke | 428/593 |
| 4,017,347 | 4/1977 | Cleveland | 428/186 |

FOREIGN PATENT DOCUMENTS 931,096 7/1963 United Kingdom.

Primary Examiner—Stanley S. Silverman
Attorney, Agent, or Firm—James R. Ignatowski; Russel C. Wells

[57] ABSTRACT

A multiorifice structure and a method of making the multiorifice structure is disclosed herein. The structure is made by fusing a plurality of parallel rods stacked in a regular geometric pattern. The interstices between the fused rods form a plurality of small orifices of a noncircular configuration which are ideally suited for atomizing a pressurized fluid. In the preferred embodiment, the multiorifice structure is a fuel atomizer for atomizing the fuel ejected from an automotive type fuel injection valve.

12 Claims, 13 Drawing Figures

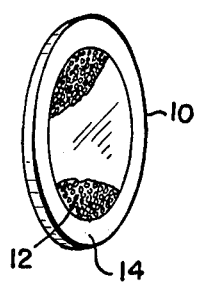
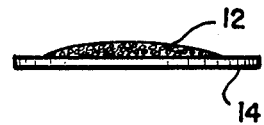
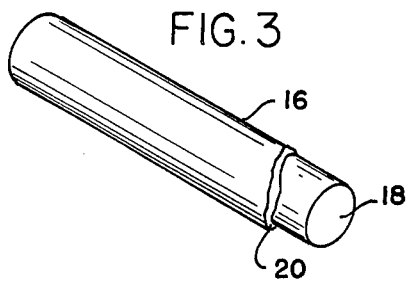
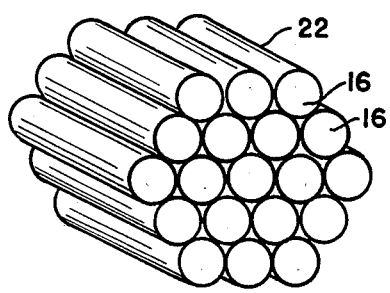
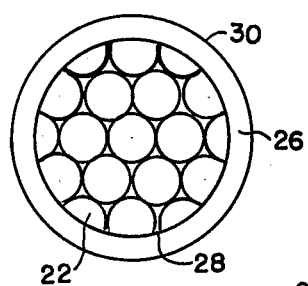
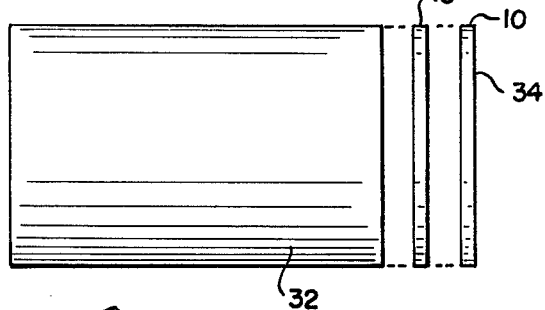
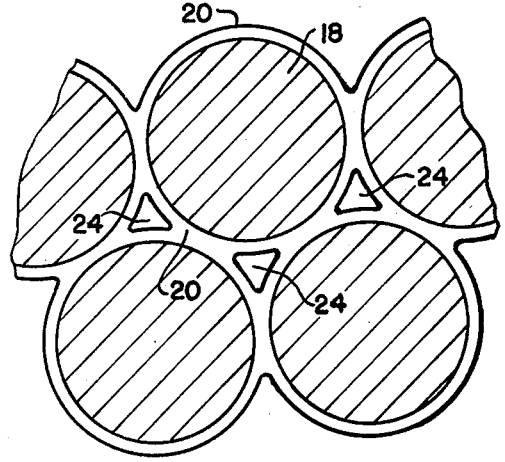

MULTIORIFICE STRUCTURE AND METHOD OF MAKING SAME

BACKGROUND OF THE INVENTION

1. Field of the Invention

The invention relates to multiorifice structures and a method of fabrication and, more particularly, to a multiorifice disc for use in conjunction with an automotive type fuel injector valve for atomizing the fuel injected into an internal combustion engine.

2. Prior Art

The use of multiorifice plates or discs in conjunction with nozzles for dispersing or atomizing an exiting fluid is well known in the art. Such multi aperture structures are found in a wide variety of applications ranging from old-fashioned sprinkling cans for watering flowers to sophisticated fuel injector valves for internal combustion engines. Whether the multi apertured structure merely disperses the fluid as with the sprinkling can or atomizes the fluid as is desirable in the automotive fuel injector application, depends upon several factors, one of which is the size and shape of the individual apertures, as well as the force with which the liquid is ejected. For fuel atomizing applications, small holes in the range from several hundred to less than one hundred microns range appear to be best suited. Various techniques for making such multi apertured structures are known in the art. Because of the size of the holes, drilling or punching the individual apertures is generally not considered because costs would be prohibitive for competitive, high production applications. Alternate techniques are photoetching or fusion of small diameter tubes, such as taught by Roberts et al. in U.S. Pat. No. 3,737,367 (June 1973). Because of the depth of the holes required, fabrication of the multi aperture structure using photoetching techniques is quite complex and usually requires etching from both sides to obtain the required uniformity of the holes. The tubular approach taken by Roberts et al. appears to be the better of the two methods, but in this process the tubes must be filled to prevent the individual tubes from collapsing. Therefore, a subsequent etching step is required to etch out the filled holes. Further, the orifices produced by the Roberts et al technique are generally circular in configuration. However, the orifices may have a hexagonal configuration, as taught by Varian et al. in U.S. Pat. No. 2,619,438 (Nov. 25, 1972) using a similar technique.

Experimental evidence indicates that better atomization can be achieved from triangular or other nonsymmetrical orifices where surface tension forces cause the exiting or ejected fluid to vibrate at higher frequencies and, therefore, break up into smaller particles.

The disclosed invention is a method for producing a multiorifice structure which parallels to some extent the method taught by Roberts et al which results in a multiorifice structure having noncircular apertures, has greater structural strength, and superior atomizing capabilities.

In the disclosed invention, the interstices between geometrically stacked rods form the orifices of the multiorifice structure. The basic concept of using the interstial spaces between wires as a fluid passageway is taught by Fassler in U.S. Pat. No. 3,602,620 (August 1971). In this patent, the interstices between the wires form a passageway for oxygen gas in a thermal lance. The thermal lance has a relatively long length to diameter ratio and the wires are twisted to impede the oxygen flow.

SUMMARY OF THE INVENTION

The invention is a multiorifice structure or plate having a plurality of small apertures disposed therethrough and a method for making the multiorifice structure.

The structure is made by fusing a plurality of parallel rods stacked in a geometric pattern to form a fused assembly. This assembly is then sliced into thin wafers in a direction generally normal to the axes of the fused rods. The orifices are formed by the interstices between the fused rods. In the preferred embodiments, the rods may be stacked in a square or hexagonal pattern and the resultant apertures will be either a four-cornered star or a triangle, respectively. These noncircular orifices are ideal for atomizing a pressurized fluid passing therethrough such as would be used to atomize fuel ejected from an automotive fuel injector valve.

An object of the invention is a multiorifice structure having noncircular apertures.

Another object of the invention is a multiorifice structure which has a plurality of noncircular apertures of uniform size and distribution.

Another object of the invention is a method for making the multiorifice structure which is simple and inexpensive without the need for expensive dies or require the use of photoetching techniques.

BRIEF DESCRIPTION OF THE DRAWINGS

FIG. 1 is a perspective of the multiorifice structure.

FIG. 2 is a side view of an alternate embodiment of the multiorifice structure having a curved surface.

FIG. 3 is a perspective of a coated rod used in the fabrication of the multiorifice structure.

FIG. 4 is a perspective of a stack of coated rods arranged in a hexagonal pattern.

FIG. 5 is an end view of a fused stack embodying a fused rim.

FIG. 6 is a side view of an integral assembly being sliced into wafers.

FIG. 7 is an end view showing the resultant triangular shaped apertures.

DETAILED DESCRIPTION OF THE INVENTION

Figure 8:
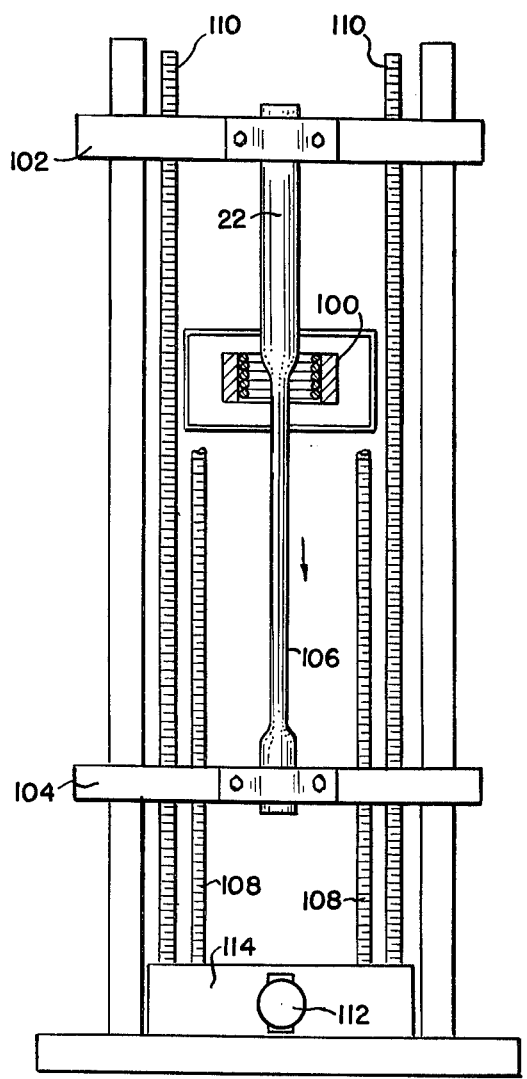
FIG. 8 is an illustration of a drawing fixture.

An exemplary embodiment of the multiorifice structure as disclosed is shown in FIG. 1. The multiorifice structure, designated generally by the numeral 10, is a thin wafer comprising a matrix of fused rods or wires 12 wherein the interstices between the rods are the desired orifices. The wafer 10 may or may not be enclosed about its periphery by a support portion, such as rim 14. The use of the rim 14 is optional and will often depend on the intended application. Although the multiorifice structure 10 is illustrated as a circular wafer, it may also take the form of a triangle, rectangle or any other know configuration which is primarily determined by its intended application. The multi aperture structure may be a flat wafer, as illustrated in FIG. 1, or it may be coined or pressed to produce a curved or domed shaped structure, as shown in FIG. 2. In the latter combination the angle of the spray cone may be established by controlling the radius of curvature of the "dome".

The details of the multiorifice structure 10 will become apparent from the following description of how it is made. Referring to FIG. 3, a coated rod 16 has an inner or core rod 18 which is coated with a thin layer of material 20 having a lower melting temperature than that of the core rod. It is understood the core rod 18 may be a rigid rod, a wire, a filament or any other similar elongated circular element. The material of the core rod 18 is normally determined by the end use of the multiorifice structure and may be a metal, glass or suitable thermal plastic. Where high structural strength is required, metals such as stainless or carbon steels, tantalum titanium or tungsten may be used. Where structural strength is not critical or when the multiorifice structure is to be used to atomize a corrosive material, glass or a suitable plastic may be more appropriate.

In the preferred embodiment, the multiorifice structure is a spray disc for atomizing the fuel ejected from an automotive fuel injector valve. Because the fuel is ejected under considerable pressure, the spray disc must be able to withstand the force of the ejected fuel. In the illustrated embodiment, the rods 18 are made from stainless steel and the coating material 20 is a thin layer of copper uniformly disposed over the surface. The copper coating may be applied by any known method, such as electroplating, vapor deposition, dipping or plasma spraying. Alternately, the stainless steel rod may be sheated in a thin tube of copper, and the copper tube drawn or shrunk down on the rod. The thickness of the coating material 20 is normally about five percent of the diameter of the rod but may be more or less depending upon the application. Thicker layers of coating materials generally tend to increase the strength of the structure, but also reduces the effective size of the apertures, as shall be discussed later.

A plurality of coated rods 16 are stacked in a regular geometric pattern to form a boule or stack, such as the hexagonal stack 22 illustrated in FIG. 4. A stack 22 may comprise only several rods, as illustrated in FIG. 4, but for many applications may consist of several thousand coated rods.

The stack is then placed under a compressive force by a suitable fixture and heated to a temperature sufficient to cause the coating material at the points of contact between adjacent rods to fuse forming a fused stack 22. Because of the thinness of the coating material 20, the interstices 24 between the adjacent rods will remain open, as shwon on FIG. 7. The effective aperture of the open interstices 24 is primarily controlled by the diameter of the dore rods 18, however, the effective aperture may be varied, within limits, by controlling the thickness of the coating material. Increasing the thickness of the coating material will decrease the effective aperture of the interstices 24. Inversely, decreasing the thickness of the coating material will effectively increase the effective aperture, however, with thinner coatings, the resultant structure will be physically weaker. By controlling the diameter of the core rods 18 and the thickness of the coating material 20, the effective aperture size and number of interstices 24 per unit area may be varied to meet a variety of practical applications.

The fused stack 22 may then be machined or ground to the desired external configuration. This may be round, square or any other desired shaped, as previously discussed.

If it is desirable to add a rim 14, as illustrated in FIG. 1, the stack 22 may be ground into a cylindrical configuration and inserted into a tube 26, as shown in FIG. 5. Tube 26 may have its internal surface coated with a material 28 which may be the same coating material used to coat the core rods 18 or it may be an alternate material having an even lower softening temperature. The tube 26 with the stack 22 therein is then heated to the softening point of the coating material 28 and drawn down on the stack 22 thereby fusing the stack 22 to the internal surface of the tube to form an integral structure 30.

Referring to FIG. 6, a fuse stack 22 or integral structure 30, commonly referred to as a billet 32, may then be sliced in a direction generally normal to the axes of the core rods into a plurality of wafers having the desired thickness. As in known in the art, the surfaces 34 of the wafers may subsequently be ground or polished to obtain a desired surface flatness or finish. When the multiorifice structures are made of metal, a surface curvature, as shown in FIG. 2, may be achieved by coining the wafer to have the desired radius. When glass or plastic materials are used, this curvature may be achieved by heating the structure to the softening point of the coating material and either sagging or pressing the structure to the desired radius. The procedures for forming such curved surfaces are well known in the art and need not be explained in detail.

For applications which require extremely small apertures down in the micron and tens of micron region, the diameter of the rods likewise become very small. For example, in the spray disc application discussed above, the size of each side of the triangular interstice is about 75 microns (0.003 inches) and the diameter of the rods is about 0.3 millimeters (0.012 inches). Coated rods having diameters of this size are difficult to handle and stack in the desired geometrical pattern. This problem may be overcome by initially forming a stack 22 with larger diameter coated rods which have more rigidity and, therefore, are easier to handle and stack. After fusing the stack as discussed with reference to FIG. 4, this stack may be heated in an inert atmosphere and drawn down to uniformly reduce the diameter's larger core rods to the desired diameter. Referring to FIG. 8, the stack 22 is slowly fed into a zone furnace 100 by a feed mechanism 102 at one end and pulled by a draw mechanisms 104 at the other end. The feed and draw mechanisms 102 and 104 are driven at different rates by means of screw drives 108 and 110 so that the stack is under a constant tension as it passes through the zone furnace. The screw drives 108 and 110 are driven by a motor 112 through a differential speed reduction gear box 114. The portion of the stack being heating in the zone furnace is more pliable than the unheated portion and will elongate as a result of the exerted tension force. Using this method, the stack may be drawn down without distorting the circular configuration of the core rods 18, nor the stacked pattern, nor will the interstices tend to fill in. The resultant drawn down section 106 of the stack 22 has the same basic geometrical configuration of the origin stack only reduced in size. This method of reducing the size of the stacked rods is contrasted to the swagging or extruding taught by Roberts et al. in U.S. Pat. No. 3,737,367. Contrary to the method described above, swagging or extruding tend to distort a thicker coating which completely fills in the interstices.

Figure 9:
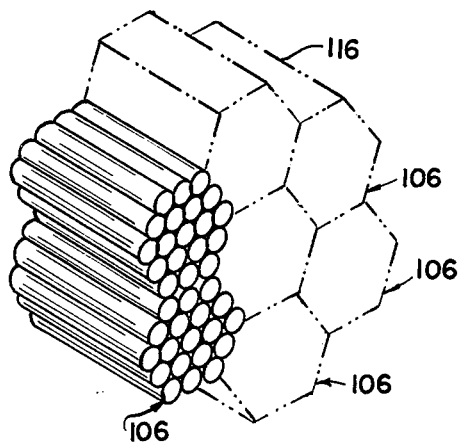
FIG. 9 is a perspective showing a stack comprising a plurality of drawn elements.

The draw section 106 is subsequently cut into short lengths which are restacked to form a composite stack 116, as shown in FIG. 9. This composite stack may be fused as discussed relative to stack 22. It also may be machined or ground to a desired configuration and a rim added as discussed relative to FIG. 5. The multiorifice structure may then be formed by slicing the composite stack 116 into thin wafers, as shown on FIG. 6.

Figure 10:
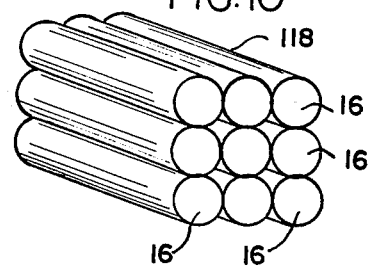
FIG. 10 is a perspective of a stack arranged in a square pattern.
Figure 11:
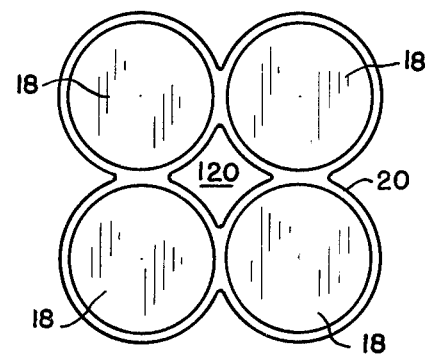
FIG. 11 is an end view showing the four-cornered star apertures obtained from a square pattern.
Figure 12:
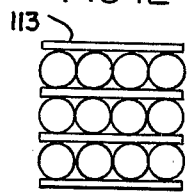
FIG. 12 is an end view of an alternate embodiment of a stack having flat plates between rows of rods.

To increase the ratio of the open to occluded area of the multiorifice structure, the stacking arrangement of the coated rods 16 may be stacked in alternative geometric patterns, such as the square stack 118 shown in FIG. 10. With this stacking pattern, the interstices take the shape of four-pointed star 120, as shown in FIG. 11. Alternatively, the rows of coated rods 16 may be interspaced with flat plates 113 having their surfaces coated with the same material coating the core rods as shown on FIG. 12.

It is well known that in drawing such billets formed of stacked rods, the relative dimensions of the various geometric features are maintained at a uniform diminishing ratio with respect to the original dimensions. Therefore, by controlling the diameter of any given rod in the drawn stacks, or of the demension across a row, the relative dimensions and hence, area of the interstices can be controlled. This is an important feature of the multiorifice structure to be used in a value such as a fuel injector valve having an independent metering orifice.

Figure 13:
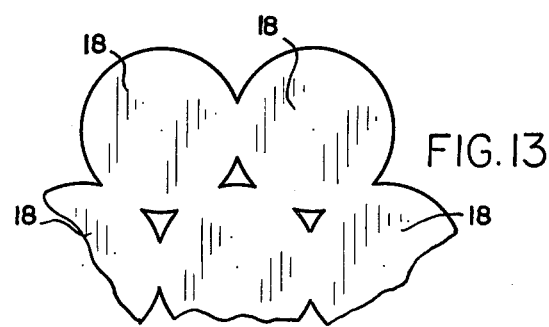
FIG. 13 is an end view of a fused stack made from uncoated rods.

It is further recognized that some materials used in the fabrication of the multiorifice structure may be fused or sintered to form stacks without the use of a coating 20 having a lower softening temperature than the core rods 18. When these materials are used, the coating material 20 may be omitted and the core rods 18 fused or sintered to form the stack 22, as shown on FIG. 13.

Having discussed the physical configuration of the multiorifice structure and various methods for forming this structure with reference to the drawings, it is recognized that persons skilled in the art could conceive other geometrical patterns for stacking the rods or different ways for fusing and drawing the stacks. It is not intended that the invention be limited to the structure shown or the method of fabrication discussed herein.

What is claimed is:

1. A multi aperture fuel atomizer plate for a fuel injector valve comprising a plurality of parallel solid rods disposed in a predetermined geometrical pattern wherein each rod is fused to each adjacent rod and the interstices formed between the fused adjacent rods form a plurality of orifices, said multiorifice structure having a first surface and a second surface and said plurality of orifices pass through said structure from said first surface to said second surface and wherein said first and second surfaces are separated by a distance small compared to the dimensions of said first and second surfaces.

2. The fuel atomizer of claim 1 wherein said predetermined geometrical pattern is a hexagonal pattern wherein each of said rods is tangent to six adjacent rods.

3. The fuel atomizer of claim 2 wherein each rod coated with a thin layer of material having a lower melting temperature than the material of said rods.

4. The fuel atomizer of claim 2 wherein said structure includes a rim surrounding said fused rods and fused integral therewith.

5. The fuel atomizer of claim 1 wherein said predetermined geometrical pattern is a square pattern wherein each of said rods is tangent to four adjacent rods.

6. The fuel atomizer of claim 1 wherein each of said rods is coated with a thin layer of a material having a lower melting temperature than the material of said rods.

7. The fuel atomizer of claim 6 wherein said structure includes a rim surrounding said fused rods and fused integral therewith 8. The fuel atomizer of claim 1 wherein said predetermined geometrical pattern is a plurality of rows of said rods and wherein said structure further includes a plurality of thin plates, wherein one of said thin plates is disposed between each adjacent row of rods.

9. The fuel atomizer of claim 8 wherein said rods and said plates are coated with a thin layer of material having a lower melting temperature than the material of said rods and said plates.

10. The fuel atomizer of claim 8 wherein said structure further includes a rim surrounding said fused rods and fused integral therewith.

11. The fuel atomizer of claim 1 wherein said first and second surfaces are co-planar.

12. The fuel atomizer of claim 1 wherein said first and second surfaces are curved.

* * * * *